July 13, 1954  G. A. LYON  2,683,629
WHEEL COVER
Filed April 18, 1952  4 Sheets-Sheet 3
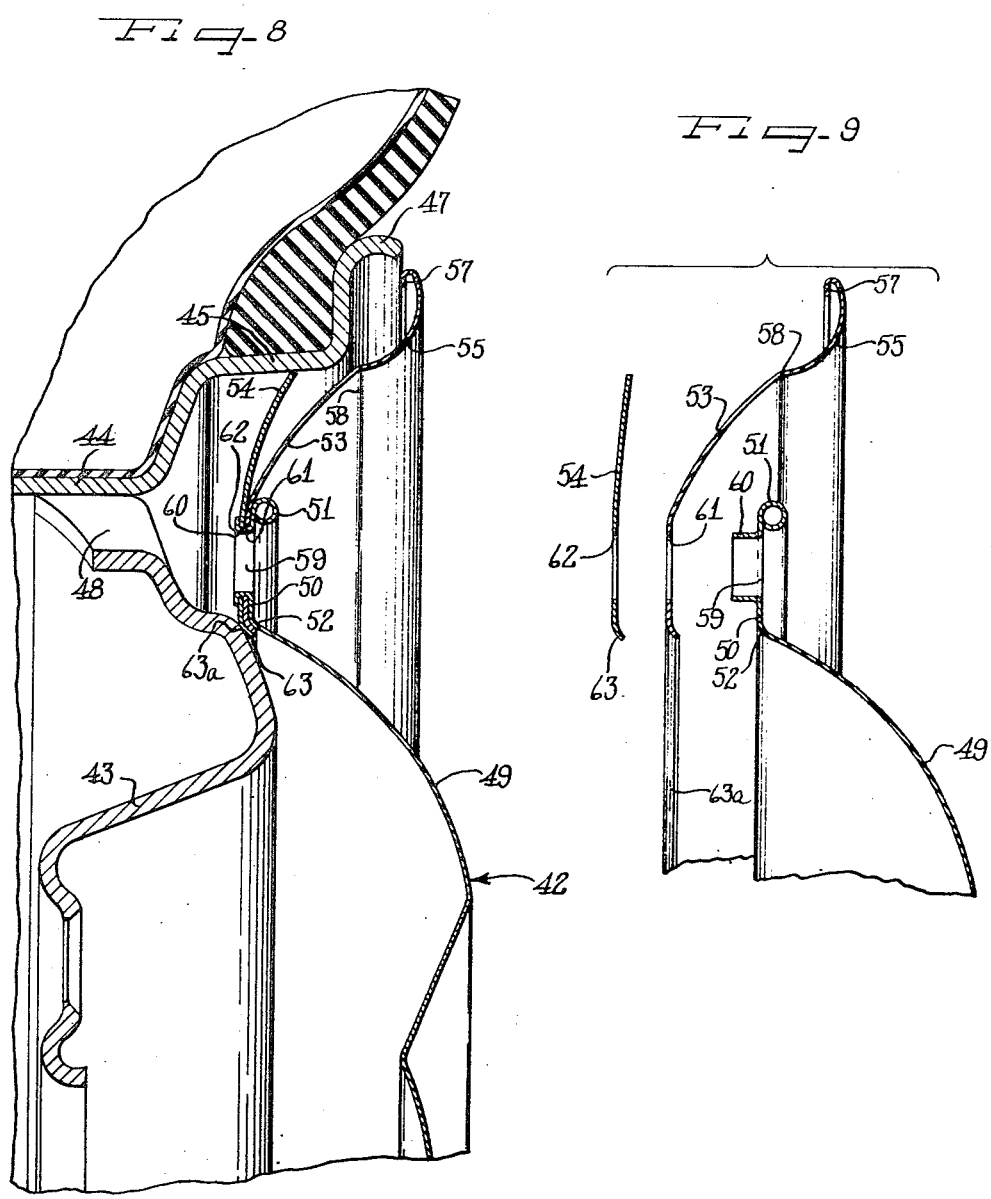
Inventor
George Albert Lyon July 13, 1954  G. A. LYON  2,683,629
WHEEL COVER
Filed April 18, 1952  4 Sheets-Sheet 4
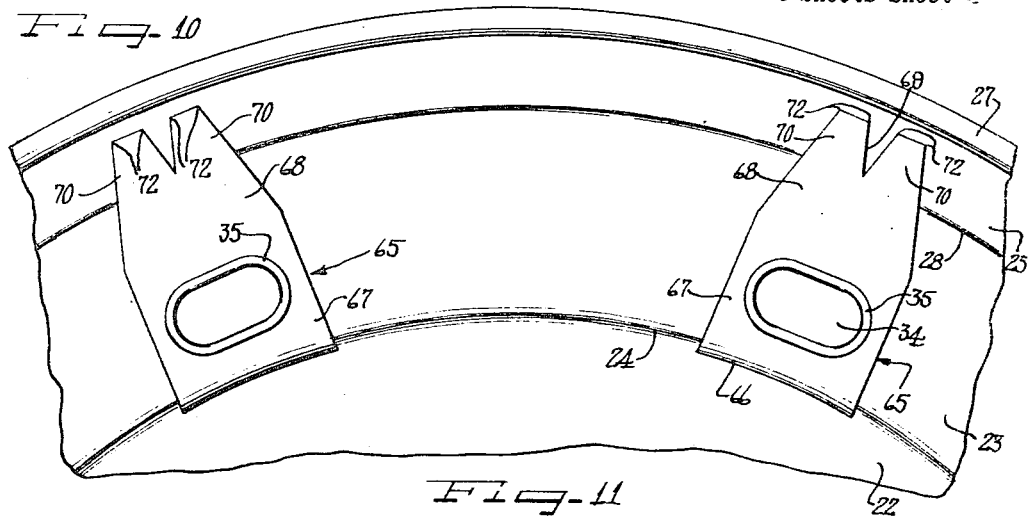
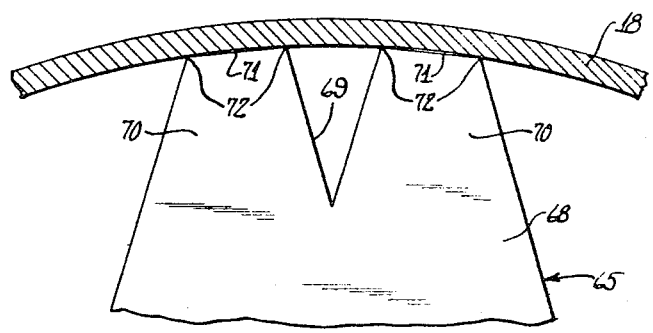
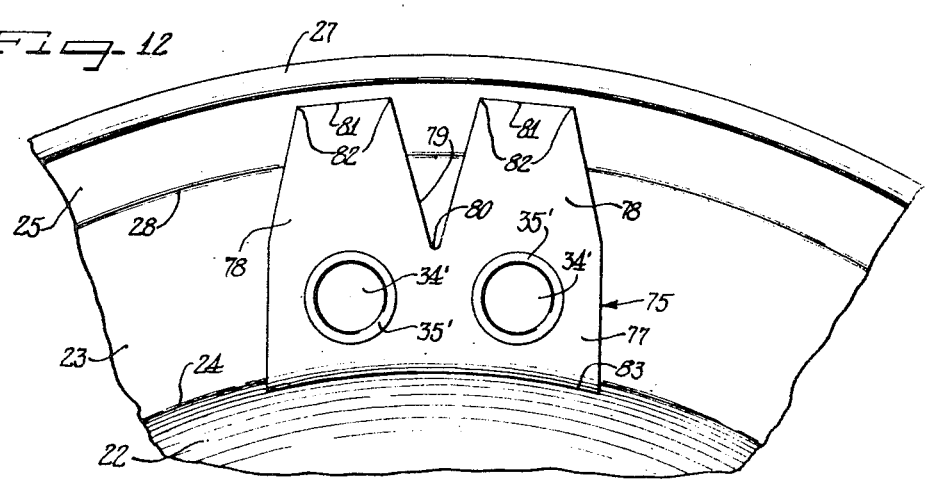
Inventor
George Albert Lyon

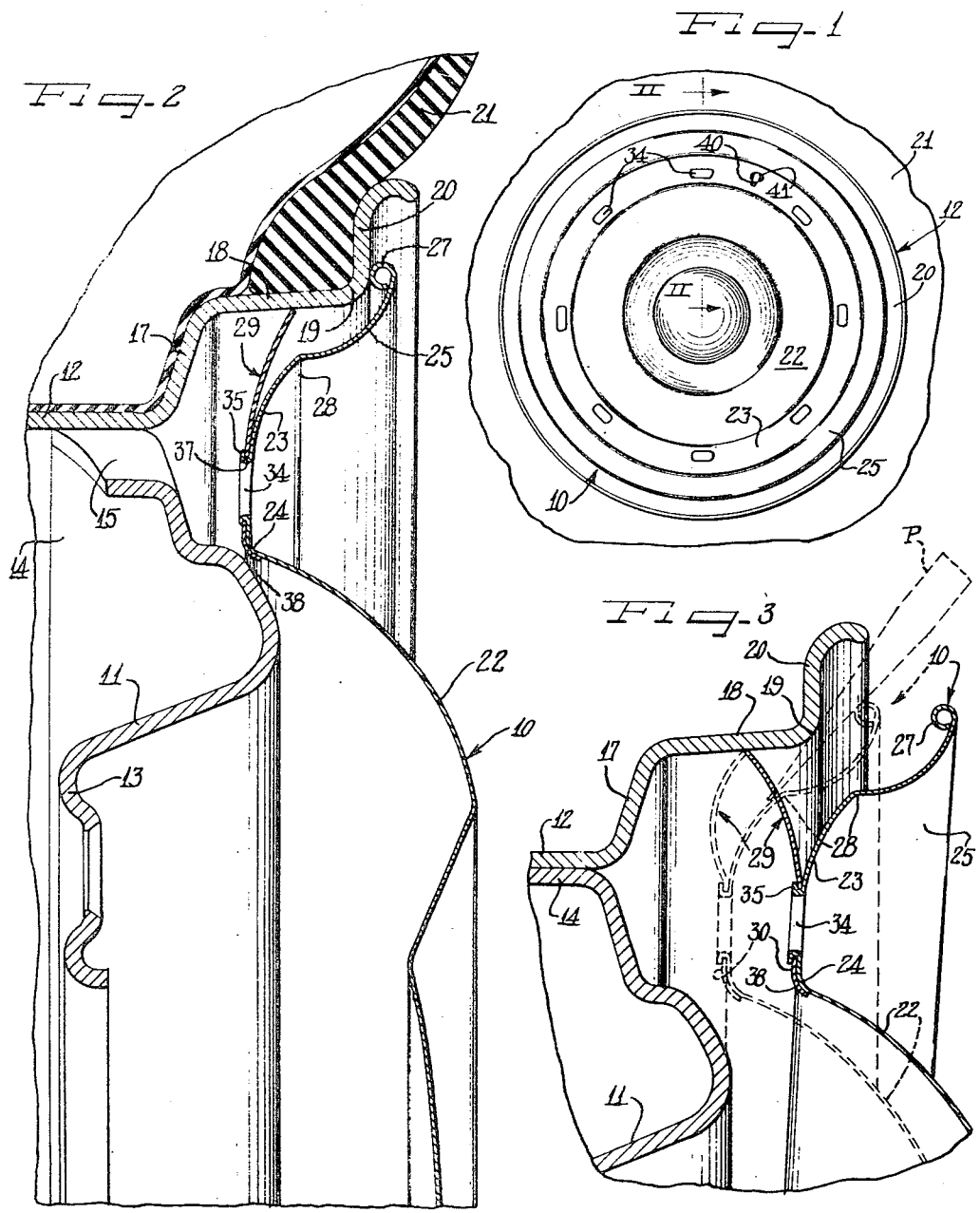

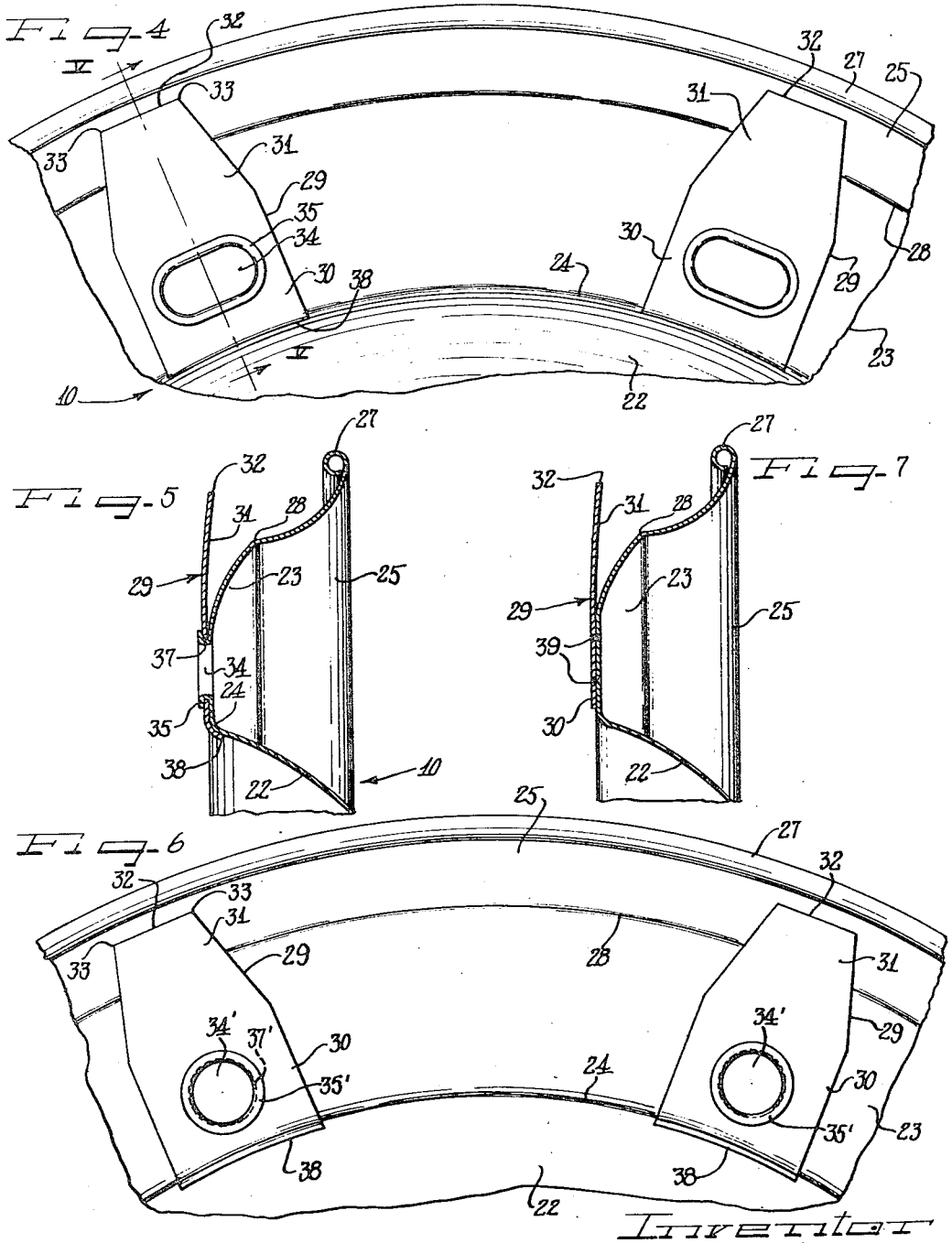

Patented July 13, 1954

2,683,629

UNITED STATES PATENT OFFICE 2,683,629

WHEEL COVER

George Albert Lyon, Detroit, Mich.

Application April 18, 1952, Serial No. 282,980

5 Claims. (Cl. 301—37)

The present invention relates to improvements in wheel structures and more particularly concerns new and improved means for ornamentally and protectively covering the outer sides of vehicle wheels.

An important object of the present invention is to provide an improved wheel structure having a cover on the outer side thereof and retained on the wheel in an improved manner to resist to a high degree unintentional displacement of the cover with respect to the wheel but capable of being pried free from the wheel at will.

Another object of the invention is to provide a novel cover retaining means for vehicle wheel covers characterized by exceptionally easy press-on characteristics but yet exceptionally hard-off characteristics, while nevertheless enabling pry-off of the cover without damage to the cover or to the retaining means or to the wheel, so that the cover can be pressed into position on the wheel or pried free from the wheel an indefinite number of times and yet maintain all desirable functional characteristics in service.

A further object of the invention is to provide cover retaining means of greatly improved cover retaining ability, but nevertheless ready response to intentionally applied pry-off force.

Still another object of the invention is to provide an improved vehicle wheel cover that is especially well adapted for low cost, mass production methods of manufacture and lends itself to a wide range of ornamental design preferences.

According to the general features of the invention there is provided in a wheel structure including a flanged member extending generally axially outwardly, a circular wheel cover having a substantially rigid annular portion spaced radially from said flange and axially inwardly relative to the outer margin of said flange, and cover retaining means extending between said rigid portion and said flange and comprising a plurality of generally radially projecting spring fingers each having a free tip fulcrum on and in biting engagement with said flange and a base portion fixedly connected to said rigid cover portion, each of said fingers having an intermediate portion bowed between said tip and said base portion and being resiliently flexible axially to an increased bowed condition upon a pry-off pressure being applied to the cover and then being adapted to snap into an opposite bowed condition during continuation of the pry-off pressure to fulcrum the finger tip and relieve said biting contact with the flange so that the tip can thereafter slide freely along said flange to release the cover from the wheel.

Another feature of the invention is to provide a wheel cover comprising a substantially rigid circular cover member, and a plurality of generally radially extending inherently highly flexible retaining fingers attached fixedly at their base portions to the cover and having flexible tip portions projecting radially behind the cover for retaining engagement with a wheel flange.

According to additional features of the invention there is provided in a wheel cover for disposition at the outer side of a vehicle wheel, a cover body structure, a plurality of generally radially extending spring retainer fingers of such high flexibility as to be bendable in opposite axial directions, and a substantially rigid annular pry-off shoulder on the cover body structure adjacent to attachment of the fingers to the cover body structure.

Other objects, features and advantages of the present invention will be readily apparent from the following detailed description of certain preferred embodiments thereof taken in conjunction with the accompanying drawings in which:

Figure 1 is a side elevational view of a vehicle wheel and cover assembly according to the present invention;

Figure 2 is an enlarged fragmentary radial sectional view taken substantially on the line II—II of Figure 1;

Figure 3 is a sectional view similar to Figure 2 but demonstrating the action of the retaining spring fingers during pry-off;

Figure 4 is a fragmentary rear elevational view of the cover;

Figure 5 is a radial sectional detail view taken substantially on the line V—V of Figure 4;

Figure 6 is a fragmentary rear elevational view of a cover showing a slight modification;

Figure 7 is a fragmentary radial sectional view through a further modification of the cover;

Figure 8 is a fragmentary radial sectional view through a further modification;

Figure 9 is a fragmentary radial sectional exploded assembly view of the cover of Figure 8;

Figure 10 is a fragmentary rear elevational view of another modification;

Figure 11 is an enlarged fragmentary sectional and elevational view of one of the finger units of Fig. 10 engaging a wheel flange; and Figure 12 is a fragmentary rear elevational view of yet another modification.

A wheel cover 10 (Figures 1 through 5) embodying features of the invention is adapted to be applied in covering, protective relation to the outer side of a vehicle wheel including a wheel body 11 and a tire rim 12. Both the wheel body and the tire rim may be of the substantially standard type in current use wherein the wheel body is made as a stamping from a suitable heavy grade of sheet steel and the tire rim is a rolled sheet steel section.

At its central portion the wheel body 11 has a bolt-on flange 13 by which the wheel is attached to an axle portion of a vehicle such as the brake drum as is usual practice. At its periphery the wheel body has a generally axially extending attachment flange 14 which is suitably secured as by welding or riveting to the base flange of the tire rim 12. The attachment flange 14 at suitable intervals is inset to afford air circulation openings 15 through the wheel.

The tire rim 12 is of the multi-flange, drop center type including a side flange 17 extending generally radially outwardly and merging with a generally axially outwardly extending but somewhat radially tapering intermediate flange 18, in turn merging on a rounded shoulder 19 with a generally radially outwardly and then axially outwardly extending terminal flange 20. Through this arrangement the tire rim 12 is adapted to support a pneumatic tire and tube assembly 21.

According to the present invention, the wheel cover 10 is of the self-retaining type, that is, it has means thereon which will interengage with a part of the wheel without any assistance from spring clips or other special cover retaining structure on the wheel. To this end, the cover 10 comprises a body structure 22 which, although it may be formed from a plurality of pieces into a unitary assembly, preferably is formed from a single piece of appropriate gauge and quality sheet metal such as steel, stainless steel, brass, or the like. The metal sheet can be economically die pressed or drawn to afford any preferred central shape or crown structure. Radially outwardly from the central formation of the cover body, it is preferably provided with an annularly ribbed formation affording a substantial outwardly opening channel arrangement generally simulative of the fairly large outwardly opening channel arrangement between the wheel body and the tire rim of the customary wheel structure.

For rigidity, the outer generally channel shaped marginal structure of the cover body comprises a multi-ribbed cross section including an intermediate outwardly concave and inwardly convex annular flange or rib formation 23 of fairly large radius joining the central body portion of the cover on a small radius generally inwardly directed juncture rib 24. Radially outwardly from the intermediate cover portion 23 is a fairly large radius outwardly convex and inwardly concave, generally radially and axially outwardly extending marginal rib portion 25 which terminates in an underturned preferably rounded edge finishing and reinforcing annular bead 27. Juncture of the annular cover marginal rib portions 23 and 25 is on a small radius juncture rib 28 presenting a generally radially outwardly and axially inwardly facing shoulder at the back of the cover.

As will be observed in Figure 2, the diameter of the cover body 22 is somewhat less than the extremity of the tire rim terminal flange 20 so that in assembly the cover will lie inside the axially outwardly directed extremity of the terminal flange and the marginal reinforcing bead 27 of the cover will lie against the terminal flange 20 adjacent to the juncture shoulder 19. The marginal rib 25 of the cover extends generally axially and radially inwardly in spaced relation about and past the tire rim shoulder 19, and the intermediate rib or flange portion 23 of the cover is accommodated within the channel defined between the intermediate flange 18 of the tire rim and the axially outwardly bulging portion of the wheel body. The maximum inwardly bulging portion of the intermediate rib structure 23 of the cover thus lies radially inwardly opposite the intermediate tire rim flange 18.

Herein, the intermediate substantially rigid cover body rib 23 carries a series of cover retaining resiliently flexible spring clips 29. In a preferred form, the spring clips 29 are formed as individual stampings from hot rolled spring steel stock which has an extremely high degree of inherent resiliency, and is of a hardness which makes it highly resistant to wear.

Each of the retaining fingers 29 is stamped from a sheet or strip of the spring steel stock comprising a base portion 30 and a flexible tip portion 31. The base portion is preferably of substantial width to afford a high degree of transverse stability, and the tip portion 31 preferably tapers symmetrically to a gripping terminal or tip 32. While the gripping tip 32 is narrower than the base portion 30, it is nevertheless of substantial width and is preferably formed straight across normal to the longitudinal axis of the finger so as to provide opposite sharp corners 33 where the tip joins the tapered sides of the flexible tip portion 31 of the finger.

Attachment of the fingers 29 to the rigid annular intermediate body portion 23 may be effected in any suitable manner to maintain the base portions 30 of the clips fixed in position at the inner or back side of the cover portion 23 and with the flexible tip portions 31 of the fingers projecting radially beyond the cover portion 23 behind the marginal portion 25 of the cover for retaining engagement of the tips 32 of the fingers with the intermediate flange 18 of the tire rim. In a desirable form the attachment may be effected by a riveting process which may comprise actual separate rivets extending through the contiguous portion of the cover body and the base portions of the fingers but in a desirable form may comprise a structure, as shown, wherein the annular cover body portion 23 is provided at suitable equally spaced intervals with similar punched openings 34 defined about their respective perimeters by inwardly directed integral flanges 35 extending through complementary apertures 37 in the base portions 30 of the associated spring fingers 29 and turned radially from the aligned apertures into riveted, clamping retaining engagement with the margins defining the finger-base apertures. In order to retain the clips against turning, the apertures 34 and 37 are preferably elongated transversely relative to the spring retaining fingers and the retaining, clamping flanges 35 defining the apertures in the cover are of complementary shape such as the oval shape shown.

Additional turn-preventing means for the retaining fingers may be provided by forming the inner or tail end portions of the finger bases 30 with respective generally radially inwardly and axially outwardly turned angular flanges 38 generally complementary to and engaging with the juncture rib 24 at the inner margin of the annular cover portion 23.

Where the fingers are equipped with the turn-preventing tail flanges 38 the apertures in the cover portion and in the finger bases may be formed circular as shown at 34' and 37' in Figure 6 and the retaining, riveting, clamping flange will also be of circular form as indicated at 35'. In other respects the form of Figure 6 is the same as the form of Figures 1 through 5 and all of the remaining reference numerals applied to this modification are therefore identical with and designate the same parts as in the first form of the invention.

Where it is preferred not to punch holes in the cover for attachment of the retaining fingers, the base portions may be welded as indicated at 39 in Figure 7. Although the welding heat may draw the temper in the immediately adjacent areas of the base portions 30 of the retaining fingers, the remaining flexible retaining tip portions 31 of the fingers will not have the temper affected but will retain the inherent resilient spring characteristics. In the form of Figure 7, however, the tail portions of the fingers need not be provided with a turn-preventing flange since the plurality of points at which the fingers are tack riveted will prevent any turning of the fingers.

As best seen in Figures 5 and 7, in the unflexed condition of the retaining fingers 29, the flexible tip portions 31 extend in axially inwardly spaced relation to, and radially outwardly beyond the radially outer portion of the intermediate cover rib 23, and are preferably bowed or with an initial bias curving slightly axially outwardly toward the retaining extremities 32 of the respective retaining fingers. To attain the almost straight radially extending condition of the unflexed retaining fingers, the radially inner portion of the cover rib 23 may be flattened to substantially a radial plane so that the base portions 30 of the fingers thereagainst will lie similarly. The radially outer portion of the rib 23 curves generally radially and axially outwardly from closely adjacent to the radially outer sides of the apertures 34 or 34' (Figs. 5 and 6), or (Fig. 7) the radially outermost rivet juncture 39, or in any event from adjacent to the radially outer end portions of the finger base portions 30 so as to leave the tip portions 31 of the fingers free to flex axially toward and away from the radially outer portion of the intermediate cover rib.

The retaining tip extremities 32 of the retaining fingers 29 are disposed on a circle which is, in the unflexed condition of the finger tip portions 31, of a greater diameter than the inside diameter of the intermediate flange 18 of the tire rim.

In applying the cover to the wheel, the cover is generally centered with respect to the outside of the wheel and with the tip portions 31 of the retaining fingers 29 resting against the shoulder 19 of the tire rim. Then inward pressure is applied to the cover which causes the retaining fingers 29 to flex and slide inwardly along the intermediate flange 18 until the bead 27 of the cover comes to rest against the tire rim. Flexure of the retaining finger tip portions 31 increases as the cover is progressively pushed inwardly and as the diameter of the intermediate flange 18 progressively diminishes due to the generally frusto-conical shape of the intermediate flange tapering inwardly.

Application of the cover to the wheel is amazingly easy since the highly flexible retaining fingers 29 offer only slight resistance as they flex and bow while sliding inwardly at their tips along the tire rim flange 18. The resistance increases slightly toward the point where the cover bottoms against the wheel by reason of the gradual tensioning of the fingers and during which the radially inner portions of the flexible tip portions 31 may contact progressively against the cover body rib 23. Once the cover is in place, however, the retaining fingers 29 quite strongly resist any force tending to displace the cover either axially outwardly or rotatably. The sharp corners 33 of the fingers bite into the surface of the intermediate flange 18 with great thoroughness by reason of the substantially greater hardness of the material of the fingers as compared to the material from which the tire rim is made. As a result, the corners 33 of the fingers act as spurs that actually dig into the tire rim flange surface upon any outward force on the cover or on any tendency of the cover to turn on the wheel. This non-turning feature is very valuable since thereby the position of the cover will be maintained with respect to a valve stem 40 which projects through a valve stem opening 41 provided for this purpose intermediate a pair of the retaining fingers in the cover body marginal portion.

Any tendency toward outward displacement of the cover causes the tension of the retaining fingers 29 to increase by reason of the positive non-slip engagement by the spur corners 33 with the tire rim intermediate flange and the necessity for the retaining fingers to turn upon themselves so that instead of being angled forwardly the retaining finger tips 32 are angled rearwardly to slide out of engagement with the rim flange. However, in order for the fingers to turn on themselves, they must fulcrum about the respective tips 32 in engagement with the rim flange and since the base portions of the fingers are fixedly held, the fingers must buckle and snap over before the turning of the tips is effected.

Having reference to Figure 3, the action of the retaining fingers 29 during pry-off is illustrated. The tip of a pry-off tool P is inserted between the tire rim and the turned rounded bead 27 of the cover, acting as a primary pry-off shoulder, and is gradually forced inwardly to pry the cover gradually axially outwardly. As the cover is pried away from the tire rim, the adjacent retaining fingers 29 gradually bow inwardly to greater concavo-convexity as the leverage length is shortened during the outwardly arcing movement of the cover margin and fulcruming of the finger tips on the intermediate flange 18 (see dash-line position in Fig. 3). When the base portions of the adjacent fingers move from a position inwardly of center with respect to the finger tips as shown in Fig. 2, to a position outwardly of center, the now highly tensioned, buckled fingers suddenly snap into reverse as shown in full outline in Fig. 3. Thereupon the tips of the fingers can be easily slid outwardly along the tire rim flange until the cover is dislodged from the wheel.

It will be appreciated that the highly resilient fingers 29 strongly resist the buckling, inside out, over center spring turning thereof and therefore strong pry-off leverage force must be applied. This force should be applied as close to the fingers as practicable and therefore the spacing of the inner portion of the cover margin from the tire rim is such that after the tip of the pry-off tool has been forced past the primary pry-off shoulder provided by the bead 27 a secondary pry-off shoulder closer to the base portions of the fingers is engaged for more direct, powerful leverage. To this end, the tip can engage the shoulder 28 of the cover as a leverage point against which the pry-off force is exerted to snap the spring fingers over center to release the cover. In some respects the action of the fingers may be likened to the bottom of an oil can, since immediately upon release of the fingers from the cover, they snap back to the initial condition as shown in Fig. 5.

Since the spring metal of the retaining fingers 29 is quite hard, it highly resists wear, especially at the spur corners 33 and the cover can therefore be applied and removed an indefinite number of times and still hold quite securely.

In the form of the cover as shown in Fig. 2, it will be observed that in the fully applied condition, only the retaining fingers 29 and the marginal or edge bead 27 engage the wheel and in this instance only the tire rim while the remainder of the cover remains in spaced relation to all parts of the wheel including the wheel body 11. Therefore inaccuracies in the relative disposition of the wheel body and the tire rim have no effect upon placement of the cover and weaving of the wheel in service does not affect the cover. It might be noted, however, that in view of the extremely strong resistance to displacement by the retaining fingers 29 weaving of the wheel would not tend to displace the cover. Weaving action of the wheel causing slight corresponding movements of the cover would only cause the retaining corner spurs 33 of the retaining fingers to bite more deeply into the tire rim flange.

In the modified form of the invention shown in Figs. 8 and 9, a composite cover 42 is applied to the outer side of a vehicle wheel including a wheel body 43 and a tire rim 44 having an intermediate flange 45 converging with a terminal flange 47. The wheel body is provided at its margin where it joins the tire rim with inset ventilation openings 48.

In Figures 8 and 9, the cover 42 comprises a central hub-cap-like crowned body portion 49 having a flattened marginal annular portion 50 provided with a reinforcing and rigidifying terminal bead 51. A small radius inwardly directed juncture rib 52 is provided between the crown portion 49 and the marginal flange portion 50. It will thus be observed that the portion 50 is of substantial rigidity. It will be observed that the diameter of the cover member 49 as defined by the bead 51 is substantially less than the wheel body 43.

Joined to the central cover member 49 is a radially outer trim ring, annular cover member 53, and a plurality of elongated resilient spring retaining fingers 54. The annular cover member 53 is preferably of an outside diameter to substantially cover the entire rim including the terminal flange 47 and it is constructed and arranged to lie in spaced opposition to the tire rim in final assembly.

At its outer marginal portion, the annular cover member 53 is formed with an outwardly convex rib 55 of substantial radius having an underturned reinforcing bead-like edge formation 57. The inner margin of the rib 55 is joined on a small radius generally axially inwardly and radially outwardly directed rib 58 to a generally outwardly concave and inwardly convex radially and axially inwardly extending inner, main body portion of the member 53 which at its inner margin is flattened complementally to and joined to the inner side of the annular flattened flange portion 50 of the inner cover member 49.

For uniting the components of the cover 42, the outer marginal flange portion 50 of the inner cover member is preferably formed with an annular series of apertures 59 punched therethrough. Each of these apertures 59 has an inwardly directed circumscribing marginal flange 60 comprising material punched from the cover flange 50 in forming the aperture. The flanges 60 extend through respective corresponding registering apertures 61 in the inner margin of the annular cover member 53, and through complementary respective apertures 62 in the base portions of the associated retaining spring fingers 54. The inner extremity of the flange 60 is turned or riveted over to clamp the cover member 53 and the associated base portion of the spring finger 54 fixedly in place on the marginal flange portion 50 of the inner cover member. A turn-preventing generally radially inwardly and axially outwardly angled tail flange 63 on the finger 54 is adapted to nest with a corresponding inner marginal annular angled flange 63a internesting with the shoulder rib 52 of the inner cover member and assisting in maintaining the cover members concentric.

The tips of the fingers 54 are normally extended to a diameter greater than the inner diameter of the tire rim flange 45 so that the cover can be applied to the wheel in the same manner as the previously described forms of the cover, by centering the cover on the wheel and then pressing the same inwardly so that the tips of the fingers 54 slide in along the tire rim flange 45 and grippingly engage the tire rim with their tips disposed outwardly relative to a radial plane through the base portions of the clips. As a result the fingers 54 retain the cover quite effectively in the same manner as described in the previously discussed forms of the invention and in order to remove the cover from the wheel it is necessary to apply quite substantial axially outward pry-off force to cause the fingers 54 to snap over center outwardly in the same manner as described in connection with Figures 2 and 3.

In the form of Figures 8 and 9 it will be noted that the heel or tail portions 63 of the retaining clips for retaining fingers 54 bear against the wheel body while the outer margin of the cover as provided by the annular cover member 53 remains in spaced relation to the tire rim.

It will be observed in Figure 2 that since the cover is provided with substantial openings 34 adjacent to the ventilation openings 15 in the wheel, ventilation through the openings 34 is permitted. In the form of Figure 8, of course, ventilation can take place not only through the openings 59 but also past the outer margin of the annular cover member 53 which is spaced from the tire rim.

In the modification of Figures 10 and 11, the cover itself is substantially like the cover of Figures 1 through 5 and similar reference numerals indicate similar parts. The modification resides in the specific form of the retaining spring fingers, generally identified by the reference numeral 65 and having respective apertured base portions 67 secured to the cover portion 23 by the riveted retaining flange 35 and preferably provided with an anti-turn tail flange 68 internestingly engaging with the cover rib 24. Projecting radially outwardly from the base portion 67 of each clip is a flexible retaining finger portion 66 which, in this instance is notched as indicated at 69 to provide a spaced pair of short tire rim flange engaging terminal finger portions 70.

Each of the terminal finger portions 70 has the tip thereof angled preferably on the chord of the arc of the tire rim flange inner surface, in the manner indicated at 71 (Fig. 11). Thereby, each of the retaining finger terminal portions 70 is provided at each end of the retaining clip 71 with a pair of generally oppositely directed and sharp corners or spurs 72 which engage retainingly with the tire rim flange 18. Thus, instead of just two of the retaining spurs, the fingers 65 are provided with four of the retaining spurs. Under severe service conditions, of course, additional spurs may be provided, if desired.

The modification shown in Figure 12 is also adapted to be applied to a wheel cover like that shown in Figures 1 through 5 and the identical reference numerals indicate similar parts. In this modification a spring retaining finger 75 is shown which is substantially wider than the retaining fingers of the previously described forms of the invention so that a substantially wider base portion 77 is provided with a pair of similar flexible radially outwardly extending retaining finger portions 78 separated by a preferably V-shape deep notch 79 the bottom or root of which is preferably formed on a radius as is indicated at 80. Each of the spring finger portions 78 has a preferably straight cut retaining tip 81 formed on a chord of the arc of the inner surface of the rim flange to be engaged and thereby providing on each of the retaining finger portions 78 a pair of generally oppositely directed retaining corners or spurs 82 for retainingly engaging the tire rim flange.

It will be observed that the root 80 of the notch 79 of the finger 75 is preferably at a depth which assures full relative flexibility of each of the retaining finger portions 78. To this end the root 80 of the notch is in transverse general alignment with the radially outer edges of the clamping flanges 35' and projecting through and clamping the finger base 77 to the wheel cover rib portion 23 at a symmetrically spaced pair of the openings 34', of the same circular style as shown in Figure 6. By having a spaced pair of the riveting, retaining flanges 35', equal retaining anchorage is afforded for each side of the clip 77 and more particularly at the base of each of the retaining finger flexible portions 78.

Although the two spaced riveting flanges 35' will hold the fingers 75 against turning relative to the cover, the base portion 77 of the finger may be provided with an angular tail flange 83 which will internest with the cover rib 24, and thus afford additional security against turning of the finger.

In all forms of the invention described herein, the retaining fingers operate on the easy-on, hard-off principle. In each instance the retaining fingers are of the inherently highly resiliently flexible, hard spring steel stock which will operate to flex under tension in cover retaining relation and which will buckle and snap over center during pry-off but will promptly flex back to the normal condition thereof upon release from the wheel. Although in the sectional views of the drawings the retaining fingers are shown of considerable thickness for clarity of illustration and with a view to clarity in the photolithographic reproduction thereof, it will be understood that in actual practice the resilient spring steel material is substantially thinner. In a practical gauge material of approximately .025 inch thickness has been found desirable. It will be understood, of course, that thinner stock is more highly resiliently flexible while thicker stock is correspondingly stiffer.

It will be understood that modifications and variations may be effected without departing from the scope of the novel concepts of the present invention.

I claim as my invention:

1. In a cover for disposition at the outer side of a vehicle wheel, a cover body, spring finger means having apertures therein, said cover body having apertures defined by retaining flanges, said retaining flanges engaging through the apertures in the spring finger means and securing the spring finger means to the cover, said apertures being elongated in one direction and said retaining flange being of complementary formation whereby to retain the spring fingers against turning.

2. In a cover for disposition at the outer side of a vehicle wheel, a cover body, individual retaining spring fingers having base portions secured to the back of said cover body and elongated flexible body portions projecting in spaced relation to the cover body, said cover body having a shoulder adjacent to the distal ends of the base portions of the spring fingers, and tail means on the distal ends of the base portions of the spring fingers interengaging with said shoulder to hold the fingers against turning relative to the cover body.

3. In a wheel structure including a wheel body and tire rim supported thereby and having a generally axially outwardly facing annular side flange and a generally radially inwardly facing and inclined radially and axially outwardly extending annular flange, a cover for the outer side of the wheel having a radially outer portion for overlying the tire rim flanges in spaced relation therewith, and a radially inner relatively rigid annular generally axially inwardly facing portion provided with annular reinforcing offset turned areas to enhance the rigidity of said annular portion, said rigid annular portion extending toward and in opposed relation to the wheel body adjacent its juncture with the tire rim and having an annular spaced series of flexibly resilient retaining fingers with base portions connected to said rigid annular cover portion so as to be reinforced and backed up by said offset turned areas, and elongated body portions extending freely behind the cover over and spaced from said side flange generally radially outwardly to retaining tips thereon normally projecting to a greater diameter than that of the inner face of said inclined flange and retainingly bitingly thrusting generally axially outwardly obliquely against said face under substantial radially and axially inwardly bowing stress of the body portions to thereby draw the cover resiliently axially inwardly toward the wheel, each of said fingers being normally biased toward one side of a radial plane through its base portion for over center snapping of said finger to an opposite side of said radial plane in the application of the cover to the tire rim and back to said first side in the removal of the cover.

4. A wheel structure as defined in claim 3 wherein the fingers have generally radially extending notches in the retaining tips thereof to divide said tips into a plurality of retaining tips having respective spurs at the edges thereof bitingly engageable with the intermediate flange of the tire rim.

5. In a cover for disposition at the outer side of a vehicle wheel, a cover body comprising a pair of circular cover members disposed in overlapping relation, spring finger means having apertures therein, one of said cover body members having apertures registering with the apertures in the finger means, and the other of said cover body members having registering apertures defined by retaining flanges, said retaining flanges engaging through the registering apertures in the spring finger means and said one cover member and securing the spring finger means and the cover members together.

References Cited in the file of this patent

UNITED STATES PATENTS

| Number | Name | Date |
|---|---|---|
| 2,082,803 | Lyon | June 8, 1937 |
| 2,189,464 | Frisbie | Feb. 6, 1940 |
| 2,544,705 | Lyon | Mar. 13, 1951 |

FOREIGN PATENTS

| Number | Country | Date |
|---|---|---|
| 809,661 | France | Dec. 12, 1936 |